United States Patent [19]

Hull

[11] Patent Number: 5,364,463
[45] Date of Patent: Nov. 15, 1994

[54] TIRE BALLAST AND SEALANT

[76] Inventor: Jack L. Hull, 2738 Hillcrest Dr., Thousand Oaks, Calif. 91362

[21] Appl. No.: 892,178

[22] Filed: Jun. 2, 1992

[51] Int. Cl.$^5$ ................................................ C09K 3/12
[52] U.S. Cl. ..................................... 106/33; 106/169; 152/504
[58] Field of Search ................... 106/33, 169; 152/504

[56] References Cited

U.S. PATENT DOCUMENTS

| | | | |
|---|---|---|---|
| 1,233,753 | 7/1917 | Cline et al. | 106/33 |
| 2,135,940 | 4/1934 | Heil | 106/33 |
| 2,355,977 | 6/1942 | Hughes | 106/33 |
| 3,630,762 | 12/1971 | Olton et al. | 106/2 |
| 4,713,114 | 12/1987 | Smith | 106/33 |

Primary Examiner—Paul Lieberman
Assistant Examiner—Margaret Einsmann

[57] ABSTRACT

An improved tire sealant containing a hydratable salt and clay such as barium sulfate and sodium bentonite and a substantial portion of a plate like mineral such as mica. Improved suspendability and sealing performance in the presence of an alkylene glycol antifreeze such as propylene glycol is provided by an anionic thickening agent such as carboxymethylcellulose and mica flakes having an amount of both large and very fine sized particles.

9 Claims, No Drawings

TIRE BALLAST AND SEALANT

TECHNICAL FIELD

The present invention relates to a composition and method for preventing inflation loss due to puncture of vehicle tires and increases tire weight providing ballast and more particularly, this invention relates to an improved, reusable industrial tire sealant that can be used over a wide range of ambient temperatures for the lifetime of the vehicle.

BACKGROUND OF THE INVENTION

Tire failure is the most frequent cause of downtime for industrial construction equipment. This is especially the case for the heavy equipment operated adjacent to buildings under construction. There is a substantial amount of sharp debris such as nails, rods, wire, etc. on the ground which cause punctures of the tires. The downtime of the equipment effects the schedule of the operations and can cause a cascade of events delaying the project. Equipment operators, at high pay, sit idly by awaiting repair of the tire or rental of another piece of equipment. Service to repair heavy equipment tires is expensive.

Another source of unreliability is the prevalence of accidents due to tipping or rollover of heavy construction equipment. This again causes downtime and also results in expense for equipment repair and medical and leave requirements for injured personnel. All of these add to the insurance costs of the contractor.

The construction industry cannot afford any unnecessary costs. There is increasing competition, both from domestic and foreign sources. Inflation in costs of material and labor cause a spiral of upward costs difficult to predict and not capable of being controlled by the contractor unless he prepurchases all materials for the job. The industry is generally plagued with inefficient operations.

There are ways to prevent deflation of tires from punctures. One way is to fill the tire with a foamable preparation. These materials are expensive, can contain flammable or hazardous materials and are permanent. They are sensitive to contamination and require delay while the foam cures. Any voids can cause the foamed unit to break. Once installed they cannot be removed. They also are sticky and gooey and difficult to handle and cleanup. They also have low specific gravity and do not provide sufficient ballast effect.

About twenty years ago, aqueous suspensions of clays were used as tire sealants and ballasts. Certain substances such as barite, attapulgite, bentonite and the like became hydrated to a gel-like state in water. The viscous gel can seal small tire punctures. The clay suspensions have a high density and provide ballast. They also can be removed. Different amounts can be added to different tires depending on the situation.

The tire sealing clay suspensions were not completely stable and could separate resulting in tires leaking through the punctures. The size of puncture that could be sealed was limited. Furthermore, since the suspension were aqueous based and could freeze, there use was limited to locations with warmer climates.

It was attempted to depress the freezing point of the suspensions by using sea water which contains calcium and magnesium ions instead of fresh water to form the tire sealant. However, the suspension made with sea water was thinner and did not seal as well. Also calcium chloride is 20 times more toxic than sodium chloride and can corrode metal parts and degrade rubber tires and tubes.

It was then attempted to depress the freezing point of the tire sealant suspension by the addition of alkylene glycol such as ethylene glycol or propylene glycol. Though the freezing point was lowered, the suspension was destabilized and the tires leaked tire sealant through the punctures.

STATEMENT OF THE INVENTION

An improved tire sealant/ballast is provided in accordance with the invention that effectively seals tire punctures. The sealant/ballast composition has better stability and can seal larger punctures than prior products. Another aspect of the composition is the ability to act effectively as a true sealant at both high temperature and at temperatures as low as zero degrees Fahrenheit. The tire sealant composition of the invention requires minimal preparation, only mixing with an impeller mixer and pumping directly into the tire through the valve stem. There is no time to wait while the composition cures as with foamed materials. The high density of the composition increases ballast improving tire traction, efficiency and performance. The lowered center of gravity prevents equipment from rolling over improving safety. The semi-liquid gelatinous suspension cushions like air, absorbing shock and vibration. The sealant material also supports the side wall of the tire providing better stability and increases tread wear. The composition is safe to use. It is non-caustic, non-corrosive and since it is water soluble or dispersible, spills are easily cleaned up. The composition is biodegradable.

Downtime of equipment due to flats is eliminated. The cost of the tire sealant is less than the repair of one flat per tire.

The tire sealant composition will find use in tubeless or tube-type tires. It can be used on reach machines, forklifts, loaders, backhoes, pavers and the like.

These and many other features and attendant advantages of the invention will become apparent as the description proceeds.

DETAILED DESCRIPTION OF THE INVENTION

The stabilizing and leak preventing properties have both been improved according to the invention. The stability of clay suspension has been improved by adding a small amount of an anionic polyelectrolyte thickening agent preferably an anionic cellulose such as carboxymethyl cellulose. The thickening agent is usually added in very small amounts. One teaspoonful, less than an ounce of agent per 50 gallons of tire sealant can provide adequate thickening. At 5 teaspoonfuls of agent, the composition may be too thick to pump. Higher amounts can be used if thinning agents such as polyacrylic acid or a polyacrylate or a lignite material are added.

The addition of the thickening agents provides long term suspension of the clay materials. This allows long term shelf life before sale to end users and long term stability in tires. Without the thickening and suspension agent, the gel could destabilize and separate causing sedimentation of the clays to the bottom of the container. Tire sealant compositions containing the anionic agent also exhibited much better sealant characteristics.

The sealant performance is 20–30% better than suspensions not containing the agent.

However, when alkylene glycol antifreeze are added to the improved sealant, the suspension is thinned and sealing properties are degraded. However, it has been discovered according to the invention that the sealing properties are restored and are even better when a flake-like silicate mineral such as mica is added to the sealant composition. When hydrated, mica cleaves into thin flexible plates or sheets. The mica restabilizes and thickens the suspension containing alkylene glycol and provides substantially better sealing. The mica plates combine with the angular sharp, faceted clay particles to pack in and seal tire punctures. The puncture size is substantially increased.

It is also found that the addition of plate-like mineral particles also improve the sealing properties of tire sealants that do not contain alkylene glycol antifreeze materials. The optimum size of the particle appears to be between 40 and 100 mesh materials. Tire sealants containing a large amount of very small particles such as 300 to 400 mesh materials do not provide the same degree of improvement in sealing characteristics, probably because they can not pack as effectively with the clay particles. Tire sealants containing large amounts of large sizes of mica above 20 mesh again do not provide as effective sealing of punctures. Furthermore, suspensions containing the larger particles tend to block the valve stem during filling or evacuation of a tire. The optimum size appears to be 30–50 mesh materials containing less than 30% 300 mesh material by weight. The plate-like mineral is present in an amount from 25 to 200 parts per weight per 50 gallons of material usually from 50 to 150 parts per 50 gallons. When excessive amounts of mica are present, the valve stem blocks on filling.

The composition can also contain a sodium salt such as sodium carbonate or sodium bicarbonate or a polycation sequestering agent such as calgonite, a complex sodium phosphate. These compounds can be present in the sealant in an amount from 0.1 to 10 pounds per 50 gallons, usually 0.05 to 5 pounds. These compounds are believed to extract heavy ions such as barium, calcium and magnesium from the water. The sealant has better stability in softer water.

The alkylene glycol antifreeze is present in an amount depending on the freezing temperature desired. Alkylene glycols are completely miscible with water. They can replace up to ⅔'s of the water present. They are usually present in amount from 12 gallons to 27 gallons in a 50 gallon batch of tire sealant. Propylene glycol appears to provide better sealing properties than ethylene glycol.

The sealant composition usually contains from 100 to 1000 pounds of hydratable minerals per 50 gallons of suspension, preferably from 300 to 700 pounds of clay and/or heavy metal organic salts. The minerals are present in an amount to provide a density of from 14 to 17 pounds per gallon. The clays are crystalline, finely divided silicates having a particle size within or slightly above the colloidal range. They are usually hydrates of alumina and silica of the general formula $Al_2O_3SiO_2 \cdot n H_2O$ where n is a number. The best known are attapulgite, montmorillonite and sodium bentonite.

The heavy inorganic salt can comprise from 10 to 90% of the mineral, usually from 60 to 85% of the mineral. The preferred heavy salt is barium sulfate and the preferred clay is sodium bentonite.

The sealant composition is prepared by mixing the ingredients in a mixing container such as a drum by means of a mixer, preferably an impeller-type mixer. Water or water/antifreeze is first added to a 55 gallon drum. The clay and inorganic salt are added in either order usually the clay is first added slowly followed by thorough mixing for 5 minutes. Then heavy mineral salt is added followed by 5 more minutes of mixing. After hydration to a gel, a small amount of thickening agent is added followed by 5 more minutes of mixing.

The outlet of the drum is connected by a diaphragm pump to the valve stem by means of a hydroinflation tool. An air vent is installed in the tire at a height corresponding to the desired degree of fill, usually the tire is filled with tire sealant in an amount of at least 25% of the volume. The air valve core is removed and the pump is activated. The tire is filled until the tire sealant exudes from the tire vent.

The valve core is reinstalled and the inlet hose is removed from the tire. The tool, system and pump are flushed with water. The tire is inflated with air to the recommended pressure. The drum is sealed. If the sealant has sat in storage for a long period the sealant can be mixed by air pumped through the suspension by means of the pneumatic displacement pump before adding it to the tire.

To remove the tire ballast sealant from a tire the tool is again installed on the valve stem. The valve core is removed. The hoses from the pump are reversed with the inlet to the valve stem and the outlet to a drum. An air vent is placed in the top of the tire. The pump is activated to pump the sealant from the tire back into a drum. The drum is sealed and the sealant can be reused.

EXAMPLE 1

A tire sealant containing 400 pounds of barite (barium sulfate) and 33 pounds of sodium bentonite were mixed with water in a 55 gallon drum. This is similar to the long term prior art product. The gel suspension will seal some small punctures of less than 1/16th inch but has poor stability.

EXAMPLE 2

0.1% of sodium carboxymethylcellulose was added to the tire sealant suspension of Example 1. The suspension thickens and the stability improved.

EXAMPLE 3

100 pounds of 40 mesh mica was added to the tire sealant of Example 1. Sealing characteristics improved.

EXAMPLE 4

100 pounds of 40 mesh mica was added to the tire sealant composition of Example 2. Tire sealant characteristics and stability were improved. The diameter of sealed puncture increased from ¼ to 5/16 inch and ⅜ inch in some cases.

EXAMPLE 5

12 gallons of ethylene glycol replaced some of the water in the tire sealant composition of Examples 1 and 2. The stability of the suspension was affected and the tire sealant leaked through the puncture holes.

EXAMPLE 6

12 gallons of water were replaced with propylene glycol in the tire sealants of Examples 1 and 2. The stability was better than that of Example 5 but the tires still leaked.

EXAMPLE 7

12 gallons of water were replaced with propylene glycol in the compositions of Examples 3 and 4. The composition of Example 3 still had a small tendency to leak but the composition of Example 4 had improved sealing characteristics again increasing the diameter of punctures sealed from ¼ inch to ⅜ inch.

EXAMPLE 8

Experiments were conducted to determine the effect of particle size of mica on sealing characteristics. Identical ¼ inch, ⅛ inch and 1/10 inch holes were punched in identical tires. The tires were filled to above the bead of the rim with the same amounts of tire sealant and filled with air to the same pressure.

The first tire was filled with the composition of Example 3 with a 40 mesh mica having the following sieve analysis:

| TYPICAL SIEVE ANALYSIS | |
|---|---|
| ON U.S.S. #40 | 3.6% |
| U.S.S. #50 | 8.7% |
| U.S.S. #70 | 8.5% |
| U.S.S. #100 | 12.1% |
| U.S.S. #200 | 35.3% |
| U.S.S. #325 | 19.2% |
| Below U.S.S. #325 in Pan | 12.6% |
| TYPICAL PHYSICAL PROPERTIES | |
| Bulk Denisty | 47.0–60.0 lbs./cubic ft. |
| Refractive Index | 1.65 |
| Specific Gravity | 2.75 |
| Oil Absorption | 45.0 |
| pH | 8.0 |
| TYPICAL CHEMICAL ANALYSIS | |
| Silica ($SiO_2$) | 67.8% |
| Alumina ($Al_2O_3$) | 16.0% |
| Soda ($Na_2O$) | 2.1% |
| Potash ($K_2O$) | 3.9% |
| Caidum (CaO) | 0.6% |
| Iron ($Fe_2O_3$) | 2.9% |
| Iron (FeO) | 2.7% |
| Magnesium (MgO) | 1.5% |
| Manganese (MnO) | Tr |
| Titanium ($TiO_2$) | 0.7% |
| Water ($H_2O$) (Chemically Held) | 1.7% |

The tire did not leak through any puncture.

EXAMPLE 9

When the mica of Example 4 was replaced with a 10 mesh mica, the tire leaked through the ¼ and ⅛ inch punctures. When the tire rolled, the contents shifted around in the tire. The sealant had to be added through a hole drilled in the inside of the rim since the large particles of mica blocked the stem.

EXAMPLE 10

When the mica of Example 4 was replaced with a 100 mesh mica containing no large particles and over 30% fines (below U.S.S. #325 in Pan) again the tire sealant failed to seal the ⅛ and ¼ inch punctures.

It appears that the mica should not contain over 20% large particles (retained on a 50 mesh screen) and less than 30% fines (below U.S.S. #325) in order to optimally block the punctures.

The tire sealant can contain clays and salts other than those exemplified and can contain additives such as thickening or thinning agents, heavy metal binding agents, sodium salts, etc.

It is to be realized that only preferred embodiments of the invention have been described and that numerous substitutions, modifications and alterations are permissible without departing from the spirit and scope of the invention as defined in the following claims.

I claim:

1. A tire sealant/ballast composition consisting essentially of an aqueous suspension containing in parts by weight based on 50 gallons:
   at least 100 pounds of hydratable, heavy metal inorganic salts and crystalline silicate clays capable of forming a viscous gel, the heavy metal inorganic salts being at least 60% by weight of said salts and clays;
   25 to 200 pounds of mica particles which pass through a 40 mesh screen; and
   0.01 to 100 ounces of an anionic polyelectrolyte thickening agent.

2. A tire sealant according to claim 1 in which the heavy metal salt is barium sulfate.

3. A tire sealant according to claim 2 in which the clay is sodium bentonite.

4. A tire sealant according to claim 1 in which the thickening agent is carboxymethyl cellulose.

5. A tire sealant according to claim 1 in which the mica contains less then 20 percent by weight of particles retained on a 50 mesh screen.

6. A tire sealant according to claim 5 in which the tire sealant contains less than 30 percent by weight of particles passing through a 325 mesh screen.

7. A composition according to claim 1 in which a portion of the water is replaced by an alkylene glycol antifreeze.

8. A composition according to claim 7 in which the antifreeze is propylene glycol.

9. A composition according to claim 8 in which at least one-third of the water is replaced by the antifreeze.

* * * * *